INVENTOR.
HARRY CLIFFORD BATES
BY Dorsey & Cole
ATTORNEYS.

Patented Mar. 18, 1941

2,235,352

UNITED STATES PATENT OFFICE 2,235,352

APPARATUS FOR BLOWING GLASS WOOL

Harry Clifford Bates, Corning, N. Y., assignor, by mesne assignments, to Owens-Corning Fiberglas Corporation, Toledo, Ohio, a corporation of Delaware Application March 30, 1937, Serial No. 133,878

12 Claims. (Cl. 49—17)

The present invention relates to apparatus for blowing glass wool and more particularly to a type of apparatus which is less expensive to build and maintain than the most successful forms of such apparatus employed in the past.

In the more successful forms of apparatus heretofore employed, each of a plurality of bottom outlets in a forehearth has clamped to the under side thereof a refractory bushing having a wedge-shaped passage therethrough in register with a forehearth outlet. This bushing is lined with a V-shaped feeder composed of refractory metal, such as platinum, with a row of minute perforations through the bottom thereof through which molten glass is drawn downwardly and blown into a fibrous product. In order to maintain the glass at low viscosity, the feeder is suitably heated by passing an electric current therethrough.

While the foregoing type of equipment has proven quite satisfactory, it has been found that, owing to the high temperature at which the feeder must be maintained, a considerable quantity of metal is lost through volatilization of those surfaces not wetted by molten glass, thereby making the use of such a feeder rather costly; much precaution must be taken to obtain a leak-tight fit between each bottom outlet and its feeder; and replacement of any feeder necessitates the withdrawal of all glass from the forehearth.

The present invention is particularly concerned with the provision of equipment so designed that glass is fed upwardly from the body of glass in a forehearth, thereby avoiding difficulties attendant to the use of feeders associated with bottom outlets; while the design is also such that the use of a feeder made of platinum or platinum alloy is not necessary, but if the use of such is preferred a much smaller amount of metal may be used than is needed for a feeder of the previously described type, and the method of heating may be such that only those portions of the feeder which are wetted by molten glass need be subjected to the extremely high temperature so necessary for satisfactory operation.

The primary object of the present invention is an equipment by means of which the quantity production of a fibrous product, commonly referred to as glass wool, can be carried on more economically than heretofore possible.

The invention embodies among its features a bait or feeder, submerged in a bath of molten glass, which may be elevated to raise a thin film of glass from the surface of the bath into an area heated to extremely high temperatures and also into the zone of influence of a high velocity blower directing steam or other suitable gaseous media upwardly, so that such media will naturally, by convection, reach higher velocities than otherwise possible, and by such action draw low viscosity glass from the bath and convert it into a fibrous product.

Figure 1:
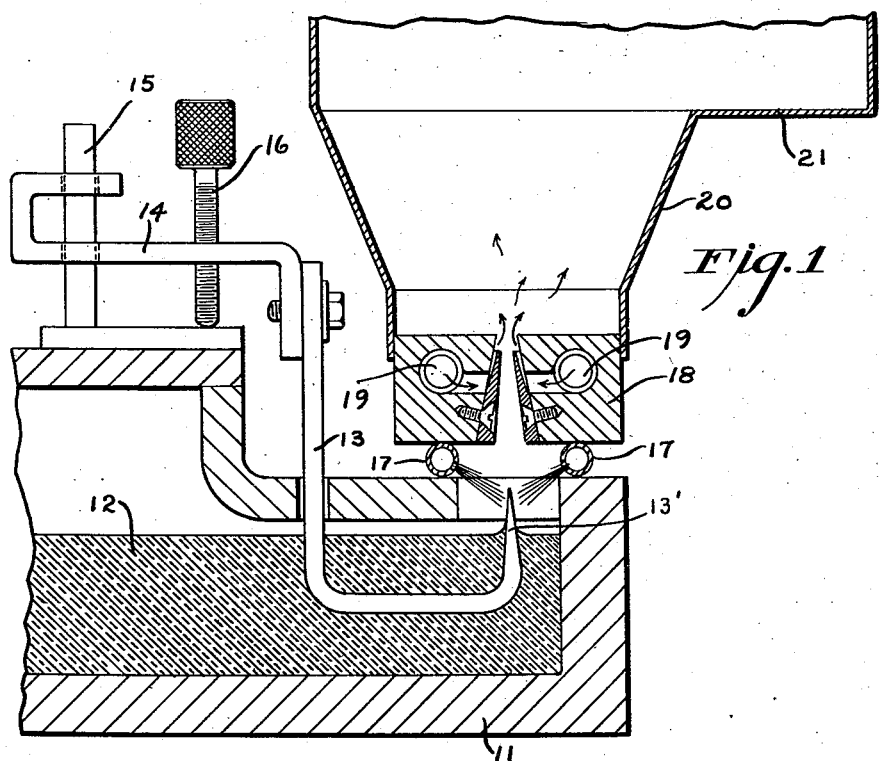
Fig. 1 is a sectional elevation of a forehearth embodying the invention.
Figure 2:
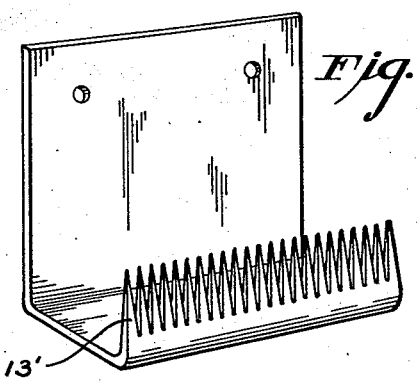
Fig. 2 is a perspective view of the feeder appearing in the side elevation in Fig. 1.

Referring to the drawing in detail, a forehearth 11, of a glass melting tank furnace (not shown) contains a bath of molten glass 12 in which a partly submerged bait or feeder 13 is suspended from a bracket 14 vertically slidable on a square standard 15 and supported by a height adjusting screw 16. The working end 13' of the feeder is in the form of a comb and oppositely disposed burners 17 are provided to maintain the area occupied by the teeth of such comb at an extremely high temperature. In order that the feeder may withstand this high temperature, it is composed of a suitable ceramic refractory or of a refractory metal, such, for example, as platinum or one of the other high melting point metals.

Arranged immediately above the burners 17 is a blower 18 which may be of the general type disclosed in Slayter and Thomas U. S. Patent No. 2,133,236, dated October 11, 1938. A suitable sheet metal enclosure 20 surrounds the blower and connects it with a horizontally disposed duct or flue 21 common to any number of units, such as above described and with which the forehearth may be provided. It will, of course, be understood that a suitable fan (not shown) is associated with flue 19 so as to create the draft necessary therein to carry off the fibrous product as it emerges from the blowers.

In initiating the production of glass wool, high velocity steam is supplied to the blower 18 and emerges upwardly, in which direction it will naturally move at higher velocities than in any other, thereby creating a high degree of vacuum in the region or zone immediately below the blower. By raising the feeder from a position in which the working or comb-like end thereof has been below the top level of the bath of glass, each tooth thereof emerges therefrom coated with a thin film of the least viscous glass in the bath. The glass of which these films is composed being included in the intensely heated field of burners 17 will remain at low viscosity even after being brought into the zone of influence of the blower 18 and until the steam actually contacts it, at which time the glass drawn from the respective teeth will become set in the form of extremely fine filaments or fibres.

As is customary, the forehearth 11 is provided with suitable burners (not shown) for maintaining the glass therein in proper working condition. If desired the burners 17 may be dispensed with and the blower 18 brought nearer the top surface of the glass in the forehearth. With such an arrangement a large volume of the hot gaseous products of combustion within the forehearth will be drawn to the area immediately below the blower so that an extremely high temperature will be maintained in this area thereby obviating the need for any auxiliary burners.

Once the upward movement of glass has been initiated the quality of the product may in some instances be improved by readjustment of the height of the feeder. Under ideal conditions the working end of the feeder may be completely resubmerged and the initial drawing of the thread-like stream of glass continued directly from the upper surface of the bath.

Figure 3:
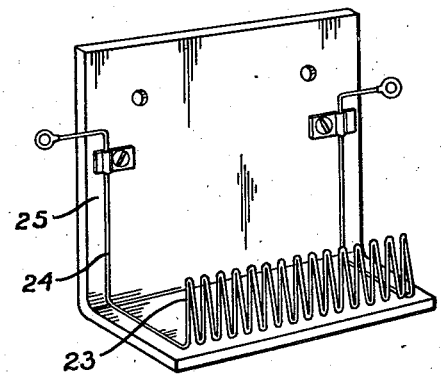
Fig. 3 is a perspective view of a modified form of feeder embodying the invention.

The feeder illustrated in Fig. 3 comprises a comb-like portion in which the teeth 23 are composed of a single continuous run of wire 24 mounted on a ceramic support 25, with the ends of the wire adapted for connection with an electric current source. This feeder is fully interchangeable with feeder 13 and can be heated in like manner, and can also be heated by passing a suitable electric current therethrough.

In Fig. 3 it will be observed that the teeth 23 are formed in saw-tooth fashion, i. e., each tooth tapering from its apex to the base of the adjacent tooth. If it is desired that the space between adjacent teeth be reduced, it is preferable to so form them that their oppositely disposed outer surfaces run parallel to one another, as illustrated in Fig. 4.

Figure 4:
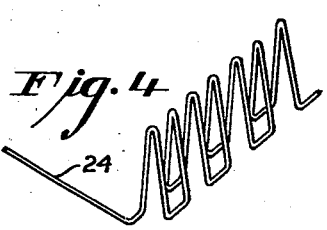
Fig. 4 is an enlarged perspective view illustrating a variation of the structure illustrated in Fig. 3.

It will be further observed that those portions of a feeder which are exposed to atmosphere are remotely located from the high temperature area at its working end and, therefore, feeders such as disclosed in Figs. 3 and 4, even when electrically heated, will not be subject to loss of metal through the action of volatilization.

While only a few specific embodiments of the invention have been illustrated and described, it is understood that various changes and modifications may be made therein within the scope of the appended claims without departing from the spirit and scope of the invention.

I claim:

1. The method of producing fibrous glass which includes mechanically elevating material from the surface of a supply body of molten glass into the field of influence of a gas moving at high velocity and thereafter continuing to draw glass from the surface of the supply body by means of said gas.

2. The method of producing fibrous glass which includes drawing glass upwardly from an unconfined surface of a molten body thereof into the field of influence of upwardly moving high velocity gas and thereafter continuing to draw glass from said body and attenuate it into a fibrous product by means of said gas.

3. The method of producing fibrous glass which includes subjecting a limited surface area of a supply body of molten glass to intense heat, raising a film of glass from such surface area into an upwardly moving current of gas and replenishing and attenuating said film by means of said current.

4. The method which comprises simultaneously elevating a multiplicity of films from the surface of a supply body of molten glass into an upwardly moving sub-atmospheric air current, attenuating said films into fibres while moving them upwardly under the influence of said current, and moving them while still plastic into an upwardly moving super-atmospheric air current and further dividing, attenuating and solidifying said fibres by means of said second current.

5. An apparatus for fabricating a fibrous product, which includes a forehearth containing a bath of molten glass, a blower located above a selected area of glass in the forehearth and arranged to direct gas upward at high velocity, a feeder for bringing glass from such bath into the zone of influence of said blower, and means interposed between said feeder and blower for maintaining the glass on said feeder at low viscosity.

6. An apparatus for fabricating a fibrous product, which includes a forehearth containing a bath of molten glass, a blower located above a selected area of glass in the forehearth and arranged to direct gas upward at high velocity; and means for feeding glass into the zone of influence of said blower.

7. An apparatus for fabricating a fibrous product, which includes a forehearth containing a bath of molten glass, a blower located above a selected area of glass in the forehearth and arranged to direct gas upward at high velocity, a feeder having a part submerged in such bath at a point below the zone of influence of said blower, and means for raising said feeder to bring glass adhering thereto into the zone of influence of said blower.

8. In an apparatus for producing a fibrous product, a refractory container having a body of molten glass therein, a blower arranged above said body of molten glass, a feeder including a continuous length of wire folded into the configuration of a comb, said feeder being so positioned with respect to the container that the comb is submerged in the said body of glass and with the apexes of its teeth directed upwardly, and means for elevating the feeder to bring said apexes into the range of influence of said blower.

9. In a glass working apparatus, a refractory container having a body of molten glass therein, a wire having parts thereof submerged in said body of molten glass, means for elevating said wire to bring submerged parts thereof above the top level of said body of molten glass, and means for drawing filaments from glass adhering to such parts and for blowing said filaments into a fibrous product.

10. An apparatus for fabricating a fibrous product, which includes a forehearth containing a bath of molten glass, a blower located above a selected area of glass in the forehearth and arranged to direct gas upward at high velocity, a feeder having one part at least partially submerged in such bath at a point below the zone of influence of said blower and having another part by means of which said feeder is adjustably supported, and means cooperating with said other feeder part for changing the position of said feeder, said latter part being remotely disposed from the zone of influence of said blower.

11. The method of producing a fibrous glass product which comprises creating a body of molten glass, mechanically raising and supporting portions of the surface glass above the surface of said body, pneumatically engaging said raised portions to continue their vertical movement, and pneumatically attenuating said portions to form fine glass filaments.

12. In a glass working apparatus, a refractory container having a body of molten glass therein, a feeder member having an upwardly extending portion at least partially submerged in said blass, a blower adjacent the surface of the glass in said container and adapted to direct gas upwardly at high velocity, and means for adjusting the position of said feeder member to bring said upstanding portion within the zone of influence of said blower.

HARRY CLIFFORD BATES.